Nov. 5, 1957  J. P. FRANCIS  2,812,208
VEHICLE FLUID SEAL AWNING
Filed Dec. 20, 1954
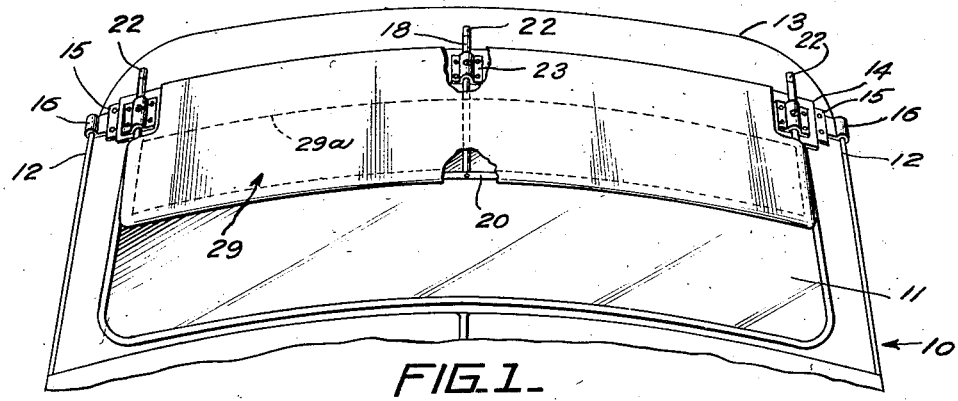
FIG. 1.
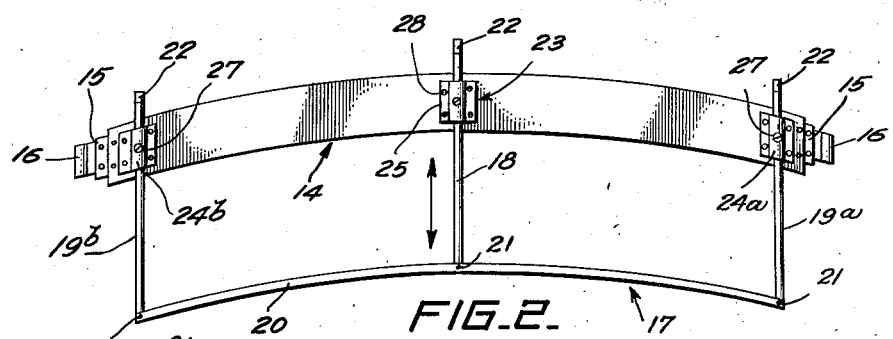
FIG. 2.
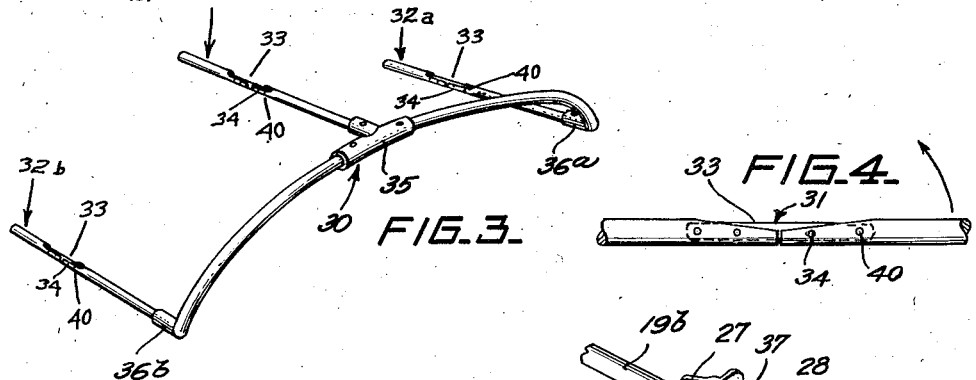
FIG. 3.  FIG. 4.
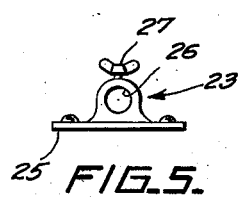
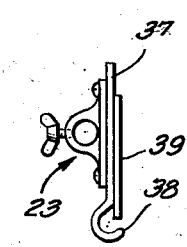
FIG. 5.  FIG. 6.
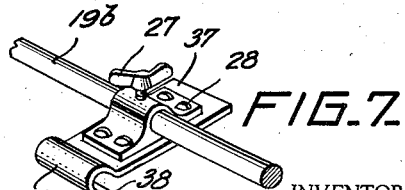
FIG. 7.
INVENTOR
John P. Francis United States Patent Office 2,812,208
Patented Nov. 5, 1957

2,812,208

VEHICLE FLUID SEAL AWNING

John P. Francis, Haverhill, Mass.

Application December 20, 1954, Serial No. 476,218

8 Claims. (Cl. 296—95)

This invention relates to improvements in windshield awnings and the supporting means therefor, and has a number of objects, one of which is to provide a simple and improved means of support for supporting an awning in fluid sealing engagement with the exterior lateral portion of the roof top of a motor vehicle.

Another object is to provide a supporting means for the awning which is easily and quickly attached to the rain gutters of the vehicle, as an entire unit or in sections of the various elements, and removable in a like manner without any defacing of the appearance of the motor vehicle.

A still further object is to provide a supporting frame for supporting an awning which is capable of being retracted when not in use, or capable of having the forward section of the supporting frame to fold back over the top of the rear section of the frame.

A still further and important object is to provide substantial protection to the windshield from sleet, snow, rain, and the formation of ice thereon, and to create an aid to visibility when viewing outdoor movies at drive-in theatres and other outdoor events, thereby eliminating the continuous or the repeated on and off use of the motor or auxiliary means to operate the windshield wipers.

With these and still other objects in view, as will hereinafter more fully appear, the invention comprises certain novel constructions, combination and arrangement of parts, hereinafter described and claimed, and illustrated in the accompanying drawings, in which:

Figure 1 is a perspective view, in fragment, of the front part of a motor vehicle, the view including a perspective view of the awning in fluid sealing engagement with the exterior lateral portion of the roof top and the means for supporting the said awning over the windshield.

Figure 2 is a top plan view of the supporting frame, without the awning thereon, shown supported by the longitudinal supporting brackets mounted on the flexible supporting band.

Figure 3 is a sectional view of a modified form of a supporting frame provided with folding longitudinal members.

Figure 4 is a side elevation view of the folding longitudinal members, as shown in Figure 3.

Figure 5 is an end elevation view of the longitudinal supporting brackets for engaging and supporting the longitudinal members of the supporting frame structure.

Figure 6 is an end elevation view of a conventional fastening bracket with a longitudinal supporting bracket secured thereto, and is a modified form of supporting a pair of longitudinal members of a supporting frame structure.

Figure 7 is a side elevation view of Figure 6, with the longitudinal supporting bracket shown engaging and supporting a longitudinal member of a supporting frame structure.

Referring now more specifically to the drawings; attention is directed to Figure 2, wherein numeral 17 generally indicates the supporting frame structure, comprising a center longitudinal member 18, a pair of side longitudinal members 19a and 19b, and a cross member 20, attached together by pins or screws 21. The frame 17 is engaged and supported by the supporting brackets 23, 24a and 24b which are secured to the flexible supporting band 14 by rivets 28 or other suitable means.

In Figure 1 is shown my awning and the supporting means mounted upon the exterior lateral portion of the roof top to provide a fluid sealing engagement between the roof 13 and the awning 29, whereby the windshield 11 is substantially protected from sleet, snow or rain falling thereon or descending from the forward slope of the roof upon the windshield area.

Referring back to Figure 1, the awning 29 is shown constructed of water repellent fabric or like material, to which the purpose therefor will be described, and to which other suitable material such as sheet metal or the like, may also be used for the covering over the frame structure 17. The awning 29 is shown provided with sleeves, formed by the stitches 29a in the fabric or like material, and made to encompass the flexible supporting band 14 and the members comprising the supporting frame structure 17 or 30. In place of the stitched sleeves 29a, snap fasteners (not shown) may be used on the awning to fasten and unfasten the sleeves around the members for easier and faster assembly or disassembly of the entire device to or from the roof of the vehicle.

The entire supporting means may be constructed for and erected on the vehicle as a permanent and rigid unit; or as a permanent unit provided with a retractable supporting frame, or a folding supporting frame, or a combination of both; or as a demountable and collapsible unit, in whole or in part, and capable of being stowed in the trunk of the vehicle for future use thereof. The type of awning 29 therefor, may be constructed of the material best suited for the purpose of the erection of the supporting means upon the roof of the vehicle.

The supporting band 14, Figure 2, is a thin band constructed of any suitable flexible material such as sheet metal, canvas webbing, or rubber, and of a substantial length to extend across the forward lateral portion of the roof top 13 and provided at the ends of the band 14 with a resilient member 15 or adjustable strap, depending upon the type of material used for the band, and having fastening hooks 16 attached thereto adapted to engage the rain gutters 12 on the body 10 of the vehicle.

On the flexible supporting band 14 are mounted the longitudinal supporting brackets 23, 24a and 24b, each having a base 25 and a longitudinal aperture 26 formed in the shoulder of the bracket to engage and support the longitudinal members of the supporting frame structure 17 and also having a wing nut 27 or set screw to secure the members of the frame 17. The supporting brackets, Figure 2, may be secured to the band 14 by rivets 28 or other suitable fastening means, or inserted from the underside through openings formed in the band 14 and fastened thereto. Although I have shown a group of three supporting brackets attached to the band 14, it is to be understood that multiples of either one, two or three brackets may be used in conjunction with the number of longitudinal members forming the supporting frame 17 or 30.

The supporting frame structure 17 or modified form 30 may be constructed with only the center longitudinal member 18 and cross member 20, thus forming a substantially T-shaped assembly, or the supporting frame may be constructed of the side longitudinal members 19a and 19b and the cross member 20, thus forming a substantially U-shaped assembly. The U-shaped type of supporting frame is also adapted to be supported by the longitudinal supporting bracket 23 attached to conventional fastening brackets 37 which are secured to the rain gutters of the vehicle. The extreme rearward ends of the longitudinal members are provided with rubber caps 22 to prevent any defacing of the roof top when the frame structure is retracted or extended over the windshield area of the vehicle.

Another embodiment of a supporting frame structure generally designated by the numeral 30, Figure 3, is provided with a folding forward section hinged at the hinge structure designated by the numeral 31 in a T-shaped frame structure and hinged at the hinge structure designated by the numerals 32a and 32b in a U-shaped frame structure adapted to fold rearwardly and over the top of the rear section of the frame structure. The hinge plate 33, Figure 4, is attached to the rear section of the frame by rivets and to the forward folding section by a removable pivot pin 34 and a removable locking pin 40. Although I have shown a folding frame structure 30 provided with a series of three longitudinal members, the T-shaped or the U-shaped supporting frame structure is preferable therefor. Also shown in Figure 3 is a modified form of a cross member having a T-shaped assembly 35 for adjusting the lateral width of the frame structure and also having arcuate ends 36a and 36b to receive the side longitudinal members of the frame structure.

The supporting frame structure 17, Figures 1 and 2, and the collapsible awning 29 fastened to the frame is adapted to be manually extended over the forward roof portion and the windshield area, and fully retracted when the use thereof is not required in the extended position. In addition to the forward and the rearward longitudinal movement of the frame structure, when the modified form of frame structure 30 is used, it is adapted to be folded and retracted in part, or fully retracted when the forward section is not in the folding position over the rear section of the folding frame structure 30.

In Figure 5 is shown a longitudinal supporting bracket 23 for engaging and supporting a longitudinal member of the frame structure 17 or 30. Although I have shown the longitudinal members to be of a tubular or rod construction, other shapes may be used therefor with the longitudinal aperture 26 of the longitudinal supporting bracket 23 made accordingly to receive the longitudinal member for support thereof. The supporting bracket 23 is also shown supported in a modified form, Figures 6 and 7, to a conventional fastening bracket 37 having an arcuate bottom 38 and provided with a clamping member 39. In this modification, the fastening bracket 37 is secured to each of the rain gutters, with my supporting bracket 23 mounted to the bracket 37. In the use of this modified form of support, a U-shaped frame structure for supporting an awning is thereby supported over the roof, with the rear portion of the awning adapted to engage the flexible supporting band 14 to provide a fluid sealing engagement with the lateral portion of the roof top.

The rear lateral portion of the awning 29 is also adapted to engage the lateral contour of the roof top 13 in fluid seal or friction supporting engagement therewith. The awning 29 is made taut over the roof section adapted to engage the side longitudinal members of a U-shaped frame structure, thereby eliminating the supporting band 14 to engage the rear portion of the awning.

Since one of the important objects of my device is to provide a fluid seal awning for viewing out-door events, such as motion pictures at drive-in theatres during inclement weather, I have provided various forms of frame structures therefor. In foul weather, prior to moving the motor vehicle to depart, with a device erected permanently on the vehicle and being provided with a rigidly secured supporting frame, no operation is required therefor. With the longitudinally movable frame structure, the frame may be manually retracted, required more so in the T-shaped frame structure. With the modified form of frame structure 30, upon sufficient movement of the vehicle, the wind pressure will normally lift and fold back the folding forward section over the rear section of the frame structure, thus eliminating the operator to leave the vehicle to retract or to fold the frame structure during the inclement weather. It is quite obvious that the removable locking pins 40 must be removed to permit the wind pressure to fold the frame structure.

To assemble and erect my device, of which there are other such ways, depending upon the construction thereof, the awning 29 is attached to the frame structure 17, with the sleeves 29a of a fabric or like awning engaging the members of the frame 17 and the supporting band 14. The assembled unit with the flexible supporting band 14 is then installed on the lateral portion of the roof top 13, with the fastening hooks 16 attached to the rain gutters 12 and tension exerted on the band 14 by the resilient end members 15, or adjustable straps, so that both the awning and the band 14 are in fluid sealing engagement with the roof top. Access openings are provided in the awning to operate the wing nuts 27 located on the longitudinal supporting brackets on the band 14. In erecting the embodiment of Figures 6 and 7, where the fastening brackets 37 are used to support the longitudinal supporting brackets 23, reference has been made thereto whereby the flexible supporting band 14 engages the rear lateral portion of the awning to provide a fluid sealing engagement with the roof top.

Having described my invention and the important objects thereof, I desire to add that the invention is also used as a sun visor awning in addition to the objects described in the specification.

I desire to add further that although I have shown the longitudinal supporting brackets secured to the flexible supporting band 14, Figures 1 and 2, and in the modified form secured to conventional fastening brackets 37, Figures 6 and 7, the said supporting brackets may also be secured to the roof top 13 by spot welding thereto or secured by suitable fastening means such as rivets through the roof top.

From the foregoing description taken in connection with the accompanying drawings, it will be manifest that a supporting means for supporting an awning from the exterior lateral portion of the roof top and over the windshield area in either fluid sealing engagement, or friction supporting engagement therewith, or a combination of both, is provided that will fulfill all the necessary requirements of such a device, but as changes could be made in the aforesaid description and apparently different embodiments of the invention may be constructed within the scope of the appended claims, without departing from the spirit or scope thereof, it is intended that all matters contained in the said accompanying specification and drawings shall be interpreted as illustrative and not in a limitative or restricted sense. Changes, therefore, in the construction and arrangement may be made without departing from the spirit and scope of the invention as disclosed in the appended claims

I claim:

1. An awning structure supported over the windshield in fluid sealing engagement with the exterior lateral portion of the roof top of a motor vehicle, comprising a flexible supporting band provided with a longitudinal supporting bracket having a longitudinal aperture within said bracket, fastening means at the ends of said band adapted to engage the rain gutters, said band engaging the lateral contour of the roof in fluid seal and in awning supporting engagement therewith, and a longitudinal frame structure having a longitudinal member, an awning secured and supported to both said frame structure and said flexible supporting band to provide a fluid seal, said longitudinal member of said frame structure being adapted to engage the longitudinal aperture of the longitudinal supporting bracket in supporting said covered frame structure over the roof in fluid sealing engagement therewith.

2. An awning structure supported over the windshield in fluid sealing engagement with the exterior lateral portion of the roof top of a motor vehicle, comprising a flexible supporting band provided with a longitudinal supporting bracket having a longitudinal aperture within said bracket, fastening means at the ends of said band adapted to engage the rain gutters, said band engaging the lateral contour of the roof in fluid seal and in awning supporting engagement therewith, and a longitudinal frame structure laterally contoured having a longitudinal member and a cross member at the outer end thereof substantially in contour with the lateral contour of the roof, an awning secured and supported to both said frame structure and said flexible supporting band to provide a fluid seal, said longitudinal member of said frame structure being adapted to engage the longitudinal aperture of the longitudinal supporting bracket in supporting said covered frame structure over the roof in fluid sealing engagement therewith.

3. An awning structure supported over the windshield in fluid sealing engagement with the exterior lateral portion of the roof top of a motor vehicle, comprising a flexible supporting band provided with a longitudinal supporting bracket having a longitudinal aperture within said bracket, fastening means at the ends of said band adapted to engage the rain gutters, said band engaging the lateral contour of the roof in fluid seal and in awning supporting engagement therewith, and a retractable laterally contoured frame structure having a longitudinal member and a cross member at the outer end thereof substantially in contour with the lateral contour of the roof, an awning secured and supported to both said retractable frame structure and said flexible supporting band to provide a fluid seal, said longitudinal member of said frame structure being adapted to engage the longitudinal aperture of the longitudinal supporting bracket in supporting said covered frame structure for outward or rearward manual movement over the forward end of the roof in fluid sealing engagement therewith.

4. An awning structure supported over the windshield in fluid sealing engagement with the exterior lateral portion of the roof top of a motor vehicle, comprising a flexible supporting band provided with a longitudinal supporting bracket having a longitudinal aperture within said bracket, fastening means at the ends of said band adapted to engage the rain gutters, said band engaging the lateral contour of the roof in fluid seal and in awning supporting engagement therewith, and a rearward folding frame structure having a longitudinal member, an awning secured and supported to both said folding frame structure and said flexible supporting band to provide a fluid seal, said longitudinal member having the rearward section thereof adapted to engage the longitudinal aperture of the longitudinal supporting bracket in supporting said covered frame structure over the roof in fluid sealing engagement and the forward section thereof being pivotally hinged centrally and transversely through and to said rear section and adapted to fold rearwardly over the said rear section of said longitudinal member.

5. An awning structure supported over the windshield of a motor vehicle, comprising longitudinal supporting brackets provided with a longitudinal aperture within said brackets, said supporting brackets being secured to fastening bracket means provided with flat portions to receive the said supporting brackets thereto and attached to the rain gutters of the vehicle, and a frame structure having longitudinal members, an awning supported to said frame structure, said longitudinal members of said frame structure being adapted to engage the longitudinal apertures of the longitudinal supporting brackets for the support and the longitudinal movement of said covered frame structure in retracting and extending the said awning over the roof and the windshield of said vehicle.

6. An awning structure supported over the windshield of a motor vehicle, comprising longitudinal supporting brackets each having a flat base and provided with a longitudinal aperture within said brackets, said supporting brackets being secured to fastening means provided with flat portions to receive the flat base of the brackets and engage the vehicle roof and attached to the rain gutters of the vehicle, and a retractable frame structure having longitudinal members, an awning secured and supported to said frame structure, said longitudinal members of said frame structure being adapted to engage the longitudinal apertures of the longitudinal supporting brackets for the support and the longitudinal movement of said covered frame structure in retracting and extending the said awning over the roof and the windshield of said vehicle.

7. An awning structure supported over the windshield of a motor vehicle, comprising longitudinal supporting brackets each having a flat base and provided with a longitudinal aperture within said brackets, said supporting brackets being secured to fastening means provided with flat portions to receive the flat base of the brackets and engage the vehicle roof and attached to the rain gutters of the vehicle, and a retractable laterally contoured frame structure having longitudinal members and a cross member at the outer ends thereof substantially in contour with the lateral contour of the roof, an awning secured and supported to said frame structure, said longitudinal members of said frame structure being adapted to engage the longitudinal apertures of the longitudinal supporting brackets for the support and the longitudinal movement of said covered frame structure in retracting and extending the said awning over the roof and the windshield of said vehicle.

8. An awning structure supported over the windshield of a motor vehicle, comprising longitudinal supporting brackets each having a flat base and provided with a longitudinal aperture within said brackets, said supporting brackets being secured to fastening means provided with flat portions to receive the flat base of the brackets and engage the vehicle roof and attached to the rain gutters of the vehicle, and a rearward folding frame structure having longitudinal members, an awning secured and supported to said folding frame structure, said longitudinal members having the rearward sections thereof adapted to engage the longitudinal apertures of the longitudinal supporting brackets in supporting said covered frame structure over the roof and the windshield of said vehicle with the forward sections thereof being pivotally hinged centrally and transversely through and to said rear sections and adapted to fold rearwardly over the said rear sections of said longitudinal members of the said folding frame structure.

References Cited in the file of this patent

UNITED STATES PATENTS

| | | |
|---|---|---|
| 2,508,757 | Gray | May 23, 1950 |
| 2,633,381 | Francis | May 31, 1953 |
| 2,783,082 | Genua | Feb. 26, 1957 |

FOREIGN PATENTS

| | | |
|---|---|---|
| 1,046,342 | France | July 8, 1953 |
| 20,218 | Great Britain | of 1907 |